June 25, 1940.   L. MAYER   2,205,664
SIGNAL LIGHT SWITCH
Filed April 29, 1939
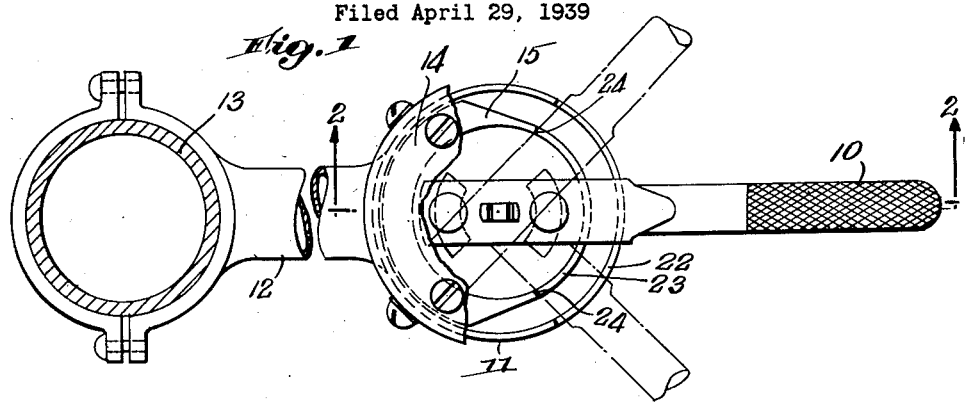
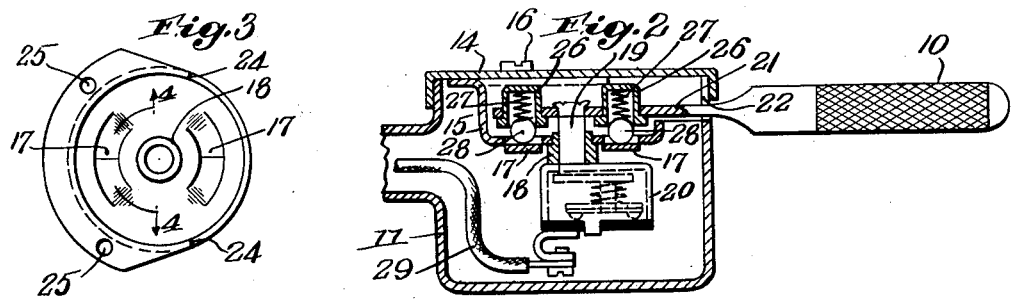
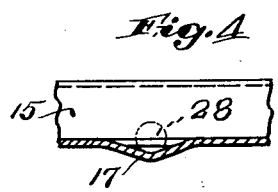
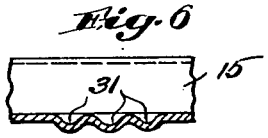
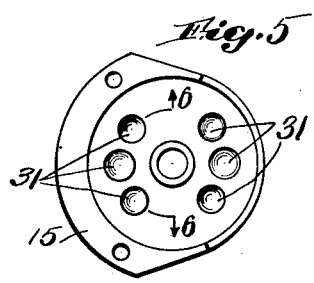
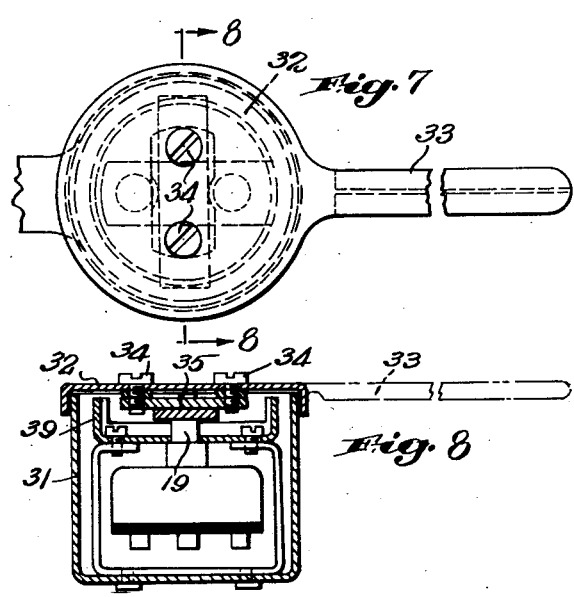
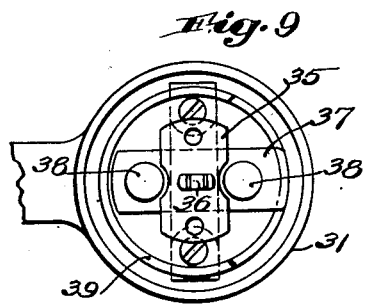
Inventor:
Leo Mayer
by Thomson & Thomson
his Attys Patented June 25, 1940

2,205,664

UNITED STATES PATENT OFFICE 2,205,664

SIGNAL LIGHT SWITCH

Leo Mayer, Newton, Mass., assignor to Henry Cole Co., South Boston, Mass., a corporation of Massachusetts Application April 29, 1939, Serial No. 270,823

4 Claims. (Cl. 200—17)

This invention relates to electric switches and pertains more particularly to switches for controlling the circuits to the direction signal lights of automobiles.

The principal purpose of the invention is to improve the manually operated means for actuating an ordinary two-contact switch by providing the operating handle with spring-pressed elements bearing against the surface of a thrust member so constructed and arranged that the lever operates with balanced action under finger tip control and that the thrust of the lever is not borne by the contact elements of the switch itself. A signal switch embodying the features hereinafter described is particularly advantageous when employed on trucks which are required by the laws of several States to be equipped with direction signals and which require a switch capable of efficient operation under frequent and forceful manipulations of the switch lever by the operators of such vehicles.

Recommended embodiments of this invention are illustrated in the accompanying drawing, but it will be understood that the structural details of the device herein described may be varied without departing from the scope of this invention as defined in the appended claims.

In the drawing:

Fig. 1 is a plan view, partly broken away, of a signal switch constructed in accordance with the invention, the switch being provided with a bracket for attaching it to the steering column of an automobile;

Fig. 2 is a sectional view taken on line 2—2 of Fig. 1, with portions of the apparatus in elevation;

Fig. 3 is a plan view of a thrust member forming part of the apparatus;

Fig. 4 is a fragmentary section taken on the arc 4—4 of Fig. 3;

Fig. 5 is a view similar to Fig. 3 showing a modified form of thrust member;

Fig. 6 is a fragmentary section taken on the arc 6—6 of Fig. 5;

Fig. 7 is a plan view of a modified signal switch constructed in accordance with the invention;

Fig. 8 is a sectional view on line 8—8 of Fig. 7; and

Fig. 9 is a plan view of the switch shown in Fig. 7 with a cover thereof removed.

In the particular embodiment chosen for the purpose of illustration in Figs. 1 to 4 inclusive, the improved signal switch comprises a housing 11 formed with a tubular bracket 12 for attaching the apparatus to a steering column 13 of an automobile; but the precise construction of the housing or its mode of attachment is not material to this invention. The housing has a cover 14 to which a cup shaped thrust member 15 is secured by screws 16 threading in apertures 25 of the member 15, the base of which is formed with depressions 17 having sloping bottoms of arc-like configuration, disposed on diametrically opposite sides of a boss 18 fitted in a central opening of the thrust member. A switch actuating shaft 19 is mounted in the boss 18 and is connected to the actuating member of any common form of two-contact rotary switch, such as that indicated as enclosed within the casing 20.

Shaft 19 is fixedly connected to an operating lever 21, remote from the inner end thereof. The lever extends outwardly of the housing 11 through slots or recesses 22 and 23 in the sides of the housing and of the thrust member 15, respectively, the projecting end of the lever constituting a handle 10 for rotating the shaft 19 and thus actuating the switch 20. The lever is movable angularly within the slot 22 of the housing 11 and the slot or recess 23 of the thrust member 15, and this movement is limited, in both directions, by shoulders 24 of the member 15 as indicated in Fig. 1. The stop shoulders 24 accordingly receive the force applied to the handle of the lever in operating the switch, and the contact elements of the switch within the casing 20 are thus relieved from any strain due to the thrust of the lever.

The inner end of the lever is provided with receptacles 26, fitted in openings therein and containing springs 27 and balls 28 which are pressed against the base of thrust member 15 by said springs. The receptacles or sockets 26 are diametrically disposed on opposite sides of the shaft 19, so that the balls 28 are seated in the bottom of the respective depressions 17 when the lever is in central or neutral position as shown in full lines in Fig. 1 and in Fig. 2. As the lever is moved to either side, the balls ride up on the sloping bottoms of the respective depressions compressing the yielding springs 27, and the balls press against the flat surface of said base when the lever is moved to "on" positions as indicated by the broken lines of Fig. 1.

It will be understood that the contacts of the switch in casing 20 are closed when the lever is moved to either of the "on" positions, thereby to illuminate a right or a left signal light, respectively; and that such contacts are open when the lever is in central or neutral position, the terminals of the switch being connected by wires 29 to the respective direction signals of the vehicle.

It will also be evident that the spring pressed balls, acting on opposite sides of the pivot formed by the shaft 19, ensure smooth operation and balanced action of the lever during its manipulation; and that, although the lever is maintained in "on" position by frictional engagement of the balls on the flat surface of the base of the thrust member, a slight manual movement of the lever away from the stop shoulder 24 will automatically carry the lever to neutral position, owing to the tendency of the spring pressed balls to slide down the sloping bottoms of the depressions 17 until the lever is centered in neutral position. This arrangement ensures that the lever will be carried to and held in "off" position, under finger tip control, except when it is moved by hand against one of the stop shoulders 24 to close the circuit to one or the other of the direction signals.

In the modified form of thrust member illustrated in Figs. 5 and 6, the base of said member is provided with three separate recesses 30 adapted to receive the respective spring pressed balls 28, instead of a single sloping depression for each ball, as previously described. This arrangement ensures a more positive engagement between the lever and the thrust member when the lever is in "on" position, and thus tends to prevent accidental displacement of the lever from any of its three operating positions.

In Figs. 7 to 9 inclusive the housing 31 is provided with a rotatable cover 32 having an integral projecting handle 33, said cover being attached by screws 34 to a plate 35 fixed to the end 36 of shaft 19. A cross plate 37 extending at right angles to the plate 35 is also fixed to shaft 19, and plate 37 is provided with receptacles 38 corresponding to the receptacles 26 of Fig. 2 and equipped with spring-pressed balls as shown in said figure. A cup-shaped thrust member 39 having recesses or depressions in its bottom and stop shoulders on its side walls, corresponding to the recesses 17 or 31 and shoulders 24 of Figs. 3 or 5, is disposed below the plate 37 in cooperative relation to the spring-pressed balls in the receptacles 38. One end of plate 37 (at the right of Fig. 9) engages the respective shoulders of the thrust member to limit the rotation of shaft 19 and absorb the thrust action of the handle 33. It is thus apparent that the operation of the optional form of switch shown in Figs. 7 to 9 is substantially the same as that described in connection with the switch of Figs. 1 to 4.

In each form of the invention herein illustrated and described, the switch operating mechanism is so constructed and arranged that all harmful or objectionable leverage, torsion or strain upon the shaft 19 and the contact elements of the switch are avoided by counterbalancing the lever 21 with the spring-pressed balls 28 and by providing the stop shoulders 24 on the thrust member 15 which bears any shock caused by hasty or forceful manipulation of the lever. It will be evident that the operating mechanism itself is mechanical in action and has no direct electrical connections or functions, and that such mechanism may be applied to any two-contact rotary switch having a rotatable actuating shaft such as the shaft 19; the contacts, terminals and other structural details of such switches being old and well known, and immaterial to this invention.

I claim:

1. A signal light switch and operating mechanism therefor, comprising a housing having a removable cover, a cup-shaped thrust member fixedly mounted within the housing, the side of said member having a slot and upstanding shoulders constituting stop members at the ends of the slot, a casing disposed within said housing and containing a two contact rotary switch, a shaft journaled in the base of said thrust member and having its lower end connected to the actuating member of said switch, a lever fixed to the upper end of said shaft and extending through the slot in the side of said member and outwardly of the housing, the lever being movable angularly between said shoulders thereby to rotate the shaft to operating and neutral positions, and the inner end of the lever extending beyond the shaft and terminating within the thrust member, and cooperating means on the lever and on the base of the thrust member, located on opposite sides of the shaft for counterbalancing the lever and yieldingly holding it in neutral position.

2. A signal light switch and operating mechanism therefor, comprising a housing having a removable cover, a cup-shaped thrust member fixedly mounted within the housing, the side of said member having a slot and upstanding shoulders constituting stop members at the ends of the slot, a casing disposed within said housing and containing a two contact rotary switch, a shaft journaled in the base of said thrust member and having its lower end connected to the actuating member of said switch, a lever fixed to the upper end of said shaft and extending through the slot in the side of said member and outwardly of the housing, the lever being movable angularly between said shoulders thereby to rotate the shaft to operating and neutral positions, and the inner end of the lever extending beyond the shaft and terminating within the thrust member, and spring-pressed elements carried by the lever on opposite sides of the shaft and bearing on the base of the thrust member to counterbalance the lever, said base having depressions diametrically disposed with respect to said shaft for receiving said elements thereby yieldingly to hold the lever in neutral position.

3. A signal light switch and operating mechanism therefor, comprising a housing having a removable cover, a cup-shaped thrust member fixedly mounted within the housing, the side of said member having a slot and upstanding shoulders constituting stop members at the ends of the slot, a casing disposed within said housing and containing a two contact rotary switch, a shaft journaled in the base of said thrust member and having its lower end connected to the actuating member of said switch, a lever fixed to the upper end of said shaft and extending through the slot in the side of said member and outwardly of the housing, the lever being movable angularly between said shoulders thereby to rotate the shaft to operating and neutral positions, and the inner end of the lever extending beyond the shaft and terminating within the thrust member, and spring-pressed elements carried by the lever on opposite sides of the shaft, and bearing on the base of the thrust member to counterbalance the lever, said base having depressions diametrically disposed with respect to said shaft for receiving said elements thereby yieldingly to hold the lever in neutral position, said depressions having inclined bottoms so that the lever is automatically urged toward neutral position as soon as the spring-pressed elements reach the inclined bottoms during movement of the lever away from operating position.

4. A signal light switch and operating mechanism therefor, comprising a housing having a removable cover, a cup-shaped thrust member fixedly mounted within the housing, the side of said member having a slot and upstanding shoulders constituting stop members at the ends of the slot, a casing disposed within said housing and containing a two contact rotary switch, a shaft journaled in the base of said thrust member and having its lower end connected to the actuating member of said switch, a lever fixed to the upper end of said shaft and extending through the slot in the side of said member and outwardly of the housing, the lever being movable angularly between said shoulders thereby to rotate the shaft to operating and neutral positions, and the inner end of the lever extending beyond the shaft and terminating within the thrust member, a pair of receptacles attached to the lever in inverted position and on opposite sides of said shaft, and spring-pressed balls disposed in the respective receptacles and bearing on the base of the thrust member for counterbalancing the lever, said base having diametrically disposed sockets for receiving said balls thereby yieldingly to hold the lever in adjusted position.

LEO MAYER.